May 5, 1925.                    G. W. BRADLEY                    1,537,002
                                 SOLDERING POT
                              Filed May 26, 1924
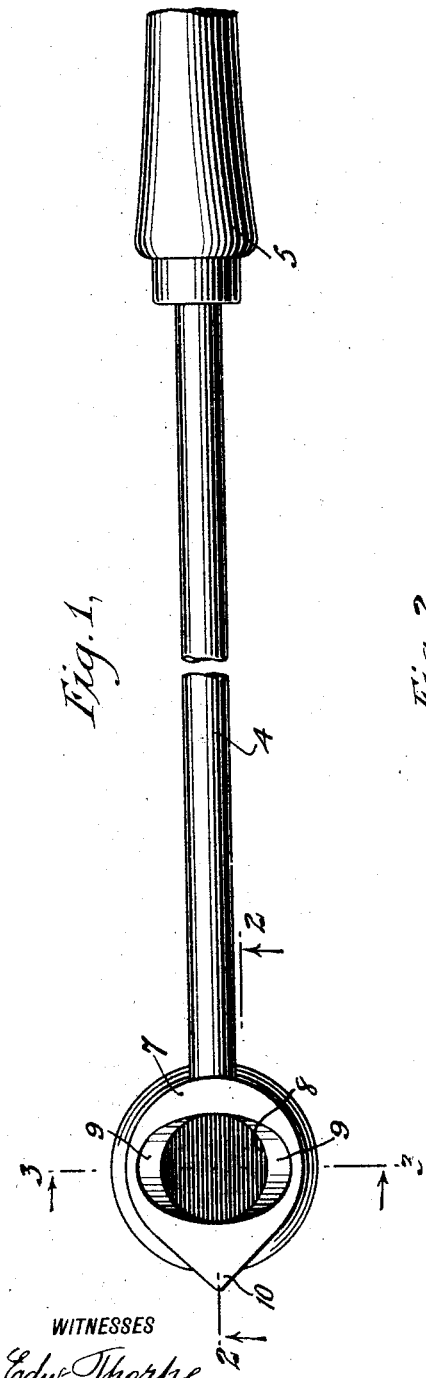
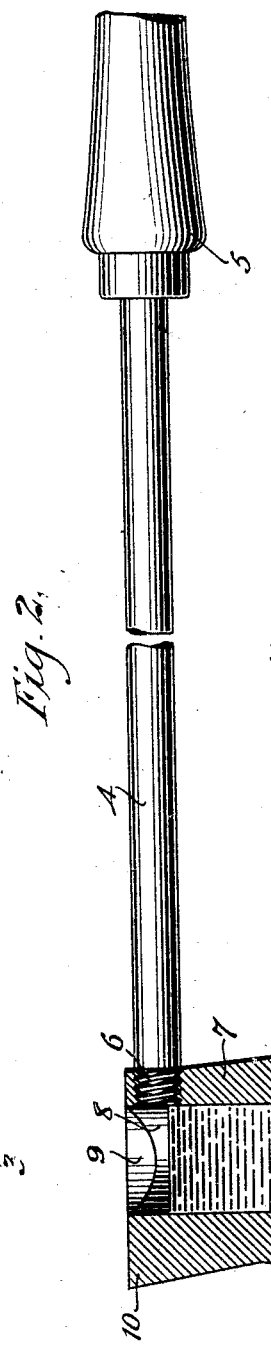
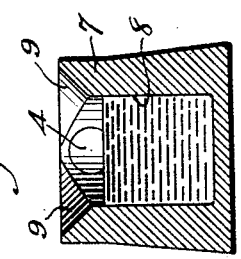
WITNESSES
INVENTOR
George W. Bradley
BY
ATTORNEYS Patented May 5, 1925.

1,537,002

UNITED STATES PATENT OFFICE.

GEORGE WILLIAM BRADLEY, OF ST. LOUIS, MISSOURI.

SOLDERING POT.

Application filed May 26, 1924. Serial No. 716,039.

*To all whom it may concern:*

Be it known that I, GEORGE WILLIAM BRADLEY, a subject of the King of Great Britain, and a resident of St. Louis, Missouri, have invented a new and Improved Soldering Pot, of which the following is a full, clear, and exact description.

This invention relates to improvements in soldering pots, and has for one of its objects to provide a pot of simple and inexpensive construction which will facilitate the making of soldered joints and which minimizes the danger of accidentally burning parts adjacent a joint or dropping solder on the floor or the like.

The above and other objects will appear more clearly from the following detailed description, when taken in connection with the accompanying drawing, which illustrates a preferred embodiment of the inventive idea.

In the drawings—

Figure 1 is a top plan view of the pot constructed in accordance with the invention;

Figure 2 is a longitudinal section taken substantially on the line 2—2 of Figure 1; and Figure 3 is a transverse section on the line 3—3 of Figure 1.

Referring more particularly to the accompanying drawing, the numeral 4 indicates a shank of the device which is provided at one end with a handle 5 and screw threaded, as indicated at 6, at its other end to permit of the receptacle 7 being secured to the shank, the screw threaded opening of the receptacle being preferably located adjacent the open end thereof.

The receptacle 7 is formed from any suitable material, such as copper and its opening 8 is formed centrally thereof and is preferably circular in cross section for a greater portion of its depth. At the outer end of the opening 8 the material of the receptacle forming the wall of said opening is reduced to form outwardly tapered portions 9 diametrically disposed with respect to each other and arranged on opposite sides of the point of connection of the receptacle with the shank 4 thus making the opening elliptical in formation at its outer end. This is done to facilitate the pouring of solder from the receptacle and also to permit of readily soldering parallel splices or joints in wire by merely bending adjacent ends of the wires slightly and dipping said ends into the solder with the wires arranged transversely with respect to the shank 4.

Diametrically opposite the point of connection of the body with the shank 4 and adjacent the upper end of the body the same is enlarged and tapered to form a soldering point 10 so that the implement may be used as a soldering iron if desired. The device is capable of being mounted upon a blow torch or the like with the receptacle 7 arranged so that the flame from the torch will be projected thereon to properly heat the same.

What is claimed is:

1. A soldering pot comprising a receptacle having relatively thick walls and an opening which is round for the greater portion of its depth and elliptical at its outer end.

2. A soldering pot comprising a shank, and a receptacle carried at one end thereof, said receptacle having a relatively thick wall the inner surface of the upper portion of which is tapered outwardly on opposite sides of the point of connection of said receptacle with said shank, whereby an elliptical shape will be given to the outer end of the opening.

3. A soldering pot comprising a shank, a receptacle carried at one end thereof and having the inner surface of the wall forming the opening therein tapered outwardly on opposite sides of the point of connection of said receptacle with said shank, said receptacle being provided opposite the shank with an outwardly projecting portion forming a soldering point.

4. A soldering pot provided with a handle and having its upper end at one side enlarged and tapered to form a soldering point.

5. As a new article of manufacture, a soldering pot provided with a handle and having a relatively thick wall and a flat bottom, the pot having the inner surface of its upper portion tapered outwardly on opposite sides, and provided with an enlarged and tapered portion opposite the handle and forming a soldering point.

GEORGE WILLIAM BRADLEY.